US008190517B1

(12) United States Patent
Baker et al.

(10) Patent No.: US 8,190,517 B1
(45) Date of Patent: May 29, 2012

(54) SYSTEM AND METHOD FOR TRANSFERRING A LINE OF CREDIT BALANCE TO A CASH ACCOUNT

(75) Inventors: Thomas C Baker, Grover Beach, CA (US); Diane M. Derocher, Peoria, AZ (US); Lawrence Stanton Hoffman, Scottsdale, AZ (US); Bruno Jimenez, Litchfield Park, AZ (US); Yogesh R. More, Phoenix, AZ (US); Pauline Raffaele, Waddell, AZ (US); Andrea M. Saporito, New York, NY (US); Jennifer Lynne Wybraniec, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 468 days.

(21) Appl. No.: 10/906,674

(22) Filed: Mar. 1, 2005

Related U.S. Application Data

(60) Provisional application No. 60/521,352, filed on Apr. 7, 2004.

(51) Int. Cl.
*G06Q 40/00* (2006.01)
(52) U.S. Cl. ............................................. 705/39; 705/35
(58) Field of Classification Search ............... 705/35–45
See application file for complete search history.

(56) References Cited

U.S. PATENT DOCUMENTS

| | | | | |
|---|---|---|---|---|
| 4,823,264 A | * | 4/1989 | Deming | 705/39 |
| 5,937,396 A | * | 8/1999 | Konya | 705/43 |
| 5,963,647 A | * | 10/1999 | Downing et al. | 705/39 |
| 5,991,750 A | * | 11/1999 | Watson | 705/44 |
| 7,383,223 B1 | * | 6/2008 | Dilip et al. | 705/39 |
| 7,395,241 B1 | * | 7/2008 | Cook et al. | 705/39 |
| 2001/0034720 A1 | * | 10/2001 | Armes | 705/65 |
| 2001/0054003 A1 | * | 12/2001 | Chien et al. | 705/14 |
| 2002/0013767 A1 | * | 1/2002 | Katz | 705/39 |
| 2002/0111915 A1 | * | 8/2002 | Clemens et al. | 705/64 |
| 2003/0018554 A1 | * | 1/2003 | Lyftogt et al. | 705/35 |
| 2003/0055783 A1 | * | 3/2003 | Cataline et al. | 705/40 |

(Continued)

FOREIGN PATENT DOCUMENTS

WO WO 00/26831 * 5/2000

(Continued)

OTHER PUBLICATIONS

Holmes, Virtual Money Chain, Black Enterprise: Nov. 2003; 34, 4; ABI/INFORM Global.*

(Continued)

*Primary Examiner* — Sarah Monfeldt
(74) *Attorney, Agent, or Firm* — Snell & Wilmer L.L.P.

(57) ABSTRACT

The present invention provides an automated system configured to facilitate transfers of cash value from one or more lines of credit to one or more deposit accounts or payment systems. An automated system ensures that requested funds are available in a customer's one or more lines of credit and electronically deposits the requested funds into one or more designated deposit accounts or payment systems. An automated system provides a means for customers to manage lines of credit, setup transfer transactions, define rules governing transfers and view transactional history. The automated system, in network connection with the lending organization's backend systems, may authenticate customer identities and credit accounts as well as insure that the requested funds are available for transfer into a deposit account.

18 Claims, 6 Drawing Sheets

U.S. PATENT DOCUMENTS

2004/0225604 A1* 11/2004 Foss et al. ............... 705/39
2005/0015332 A1* 1/2005 Chen ...................... 705/39

FOREIGN PATENT DOCUMENTS

WO    WO 01/63520    *   8/2001
WO    WO 02/21374    *   3/2002
WO    WO 2004/029761    *   4/2004

OTHER PUBLICATIONS iKobo.com, Internet Archive Wayback Machine, dated Mar. 24, 2003 (7 pages).*

* cited by examiner

SYSTEM AND METHOD FOR TRANSFERRING A LINE OF CREDIT BALANCE TO A CASH ACCOUNT

CROSS-REFERENCE TO RELATED APPLICATIONS

This application claims priority to, and the benefit of, U.S. Provisional Application Ser. No. 60/521,352 filed Apr. 7, 2004 and entitled "Automated Clearinghouse System and Method", which is hereby incorporated by reference.

FIELD OF INVENTION

The present invention relates generally to facilitating automated electronic funds transfers from lines of credit to deposit accounts, and more particularly, to a system and method for customer management of credit line funds transfers whereby transfer requests may be processed through an automated clearinghouse, depositing funds into a variety of different accounts and debiting a customer's credit lines.

BACKGROUND OF INVENTION

For years, electronic funds transfers have enabled customers to send money worldwide in real-time. In 1871, Western Union began offering customers electronic funds transfer service via telegraph. Since that time, the communication means has changed only slightly and the utility of "wire services" have increased in step with the growth of world trade. Financial institutions have been developing new technologies to encourage the transfer of funds in a line of credit to retailers and service providers. It is in the best interest of credit providers as well as their credit-worthy customers to provide more convenient and readily available methods for conducting transactions against a line of credit. Circa 1950, American Express and Diners Club introduced the first charge cards. The charge cards were intended to replace cash currency in limited circumstances allowing customers to facilitate cashless purchases that would later be paid in cash. These cards were limited in that they were only accepted by a small number of geographically bound businesses. Standards for magnetic strips were established in the early 1970's and credit cards gained wide appeal from customers and greater acceptance from venders.

Banks most often allow their customers to transfer funds from a line of credit into a deposit account. However, these types of transfers are limited in that they only allow transfers of funds from a customer's line of credit into an account which is owned by the same customer. Further, most banks will not allow an online transfer from an unaffiliated line of credit into a customers deposit account. In other words, a transfer of funds from a credit line offered by bank A into a deposit account of bank B would not be possible online. This type of transfer would likely require the customer to personally retrieve the funds from Bank A and then personally deposit the funds into the account at Bank B.

While the prior art provides a means for transferring a balance from a credit line to an account within the same institution, it does not provide the flexibility needed by increasingly sophisticated consumers who may maintain a number of different financial accounts with any number of providers. Therefore, a need exists for a system and method to provide credit line customers a means to transfer cash from one or more lines of credit into a variety of secondary accounts including deposit accounts owned by the customer, deposit accounts owned by others, and payment systems used in retailing.

SUMMARY OF INVENTION

The present invention overcomes the limitations and problems of the prior art by providing a system and method for transferring funds from lines of credit to direct deposit accounts. The system may facilitate transfers between at least one consumer and/or business credit line and at least one deposit account or payment system. A customer through a networked connection with an automated system initiates the transfer of funds from a consumer and/or business line of credit. The automated system, through a connection with the line of credit provider, obtains authentication of the customer and authorization for the transfer. The automated system then conducts a transfer of funds to one or more designated deposit accounts or payment systems via an ACH network.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

Figure 1:
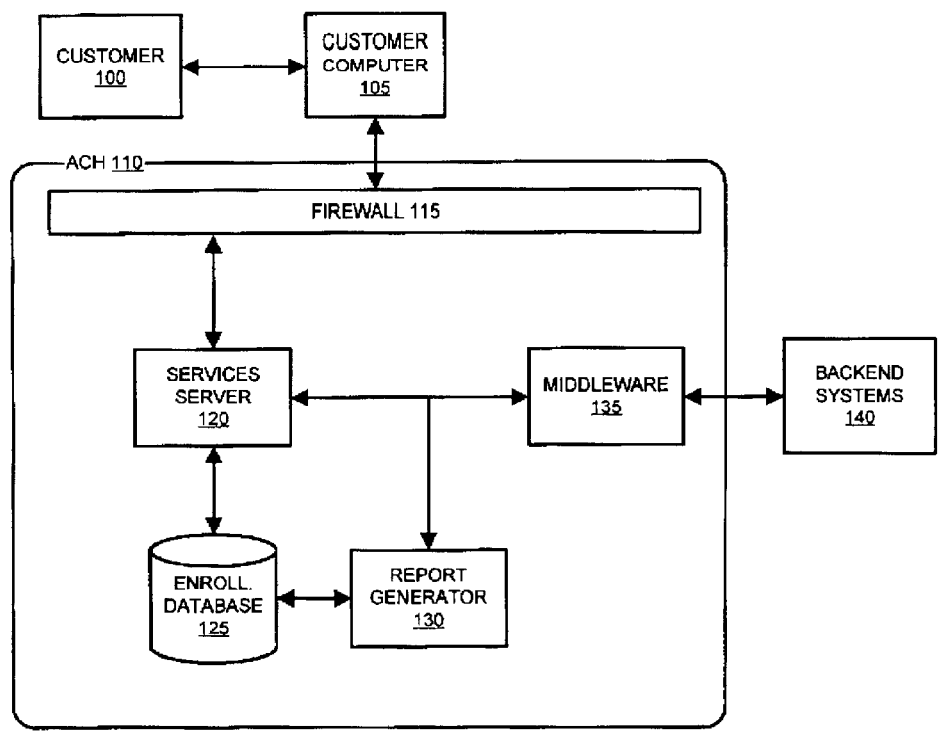
FIG. 1 is a block diagram illustrating a high level view of exemplary major system components for an automated system for processing credit line transfer transactions.

In general, the invention includes a system and method for facilitating electronic transfers of values (e.g., cash values) from one or more credit lines to one or more secondary accounts via an automated system such as an automated clearing house (ACH 110). While the invention may be described with respect to cash value transfers, the invention also contemplates transfers of anything of value such as, for example, loyalty points, merchant specific points or currency, securities, negotiable instruments, gift cards, coupons, digital funds, and/or foreign currency (including any conversions). With reference to FIG. 1, the invention may enable a customer 100 to facilitate a transfer transaction through a personal computer 105 in a networked connection to ACH 110. ACH 110 may comprise a number of hardware and/or software components configured to process transfer requests by transmitting data to and receiving data from a number of backend systems 140. Backend systems 140 may comprise any number of hardware and/or software components configured to manage credit transactions for a credit provider. ACH 110 may include, in one embodiment, one or more firewall 115, services server 120, database 125, report generator 130 and middleware 135.

As will be appreciated by one of ordinary skill in the art, the present invention may be embodied as a customization of an existing system, an add-on product, upgraded software, a stand alone system (e.g., kiosk), a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

An account manager, as used herein, may include any individual, business, entity, software and/or hardware that owns, manages or controls one or more components of the system. The account manager may own or manage some or all of the hardware and software components of the system, however this is not necessary. For example, the account manager may own or manage a component which is hosted by a third-party on a contract basis.

A customer computer 105 may include any software and/or hardware that facilitate communications and/or transactions between a customer 100 and the services of ACH 110. Customer computer 105 may interface with ACH 110 via any communication protocol, device or method discussed herein or known in the art. In one embodiment, a customer computer 105 may interface with ACH 110 via an Internet browser.

An Internet browser may comprise any hardware and/or software suitably configured to facilitate input, receipt and/or review of any information related to ACH 110 or any information discussed herein. Such Internet browsers comprise software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like.

Firewall 115 may include any hardware and/or software suitably configured to protect ACH 110 components from users of other networks and provide limited or restricted access to ACH 110 components from customer computers 105. Firewall 115 may reside in varying configurations including Stateful Inspection, Proxy based and Packet Filtering among others. Firewall 115 may be integrated within ACH 110, other system components or may reside as a standalone component.

Services server 120 may include any hardware and/or software suitably configured to process credit transfer transactions, manage processes and/or facilitate communications between external entities and components within a services server 120. Services server 120 may interface directly or indirectly with customer computer 105, database 125, report generator 130 and middleware 135. Services server 120 may be implemented as a single computing unit in a single geographic location or may comprise any number of computing units and/or components located together or residing in separate geographic locations. Services server 120 may be an Internet server configured to receive, process and send HTML streams. Further, services server 120 may exist as one or more servers, mainframes or any other computing device configured to send and receive data between itself and one or more Internet servers, workstations, personal computers and the like.

In one embodiment, a services server 120 may be configured to dispatch requests to components behind a firewall 115 in order to prevent direct access to ACH 110 components. A services server 120 may first process data transmissions between a customer computer 105 and the components of ACH 110. Services server 120 may invoke computer code to process data, request data or commit data to a database 125. Further, services server 120 may invoke computer code to construct a report using a report generator 130. Report generator 130 may request data from a database 125 to compile pre-configured and/or ad-hoc reports.

For simplicity, services server 120, database 125, report generator 130, and middleware 135 are illustrated and described herein as individual components within ACH 110. Practitioners will appreciate that the various system components of ACH 110 may reside within memory structures of services server 120 or may comprise any number of computing systems and architectures. Further, it should be appreciated that a customer computer 105 may or may not be in networked directly with ACH 110. A customer computer may connect through any number of Internet servers, routers, hubs and the like. In one embodiment, customer computer 105 may connect with a third party system and a third party system may be networked with any number of ACH 110 systems.

Database 125 may include any hardware and/or software suitably configured to facilitate storing service data and/or audit data relating to customer 100. Customer 100 data may comprise any information which may be used to identify a customer, validation credentials, credit accounts, transaction records and the like. For simplicity, database 125 is illustrated and described herein as a single database. One skilled in the art will appreciate that ACH 110 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data, which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, provider, issuer, user or the like. Furthermore, the security information may restrict/permit only certain actions such as accessing, modifying, and/or deleting data sets. In one example, the data set annotation indicates that only the data set owner or the user are permitted to delete a data set, various identified providers are permitted to access the data set for reading, and others are altogether excluded from accessing the data set. However, other access restriction parameters may also be used allowing various entities to access a data set with various permission levels as appropriate.

A stand-alone interaction device configured to add, delete, modify, or augment the data in accordance with the header or trailer may receive the data, including the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. The present invention may contemplate a data storage arrangement wherein the header or trailer, or header or trailer history, of the data is stored on the transaction instrument in relation to the appropriate data.

Report generator 130 may include any hardware and/or software suitably configured to produce reports from information stored in one or more databases 125. Report generators are commercially available and known in the art. Report generator 130 may provide printed reports, web access to reports, graphs, real-time information, raw data, batch information, and/or the like. Report generator 130 may be implemented through commercially available hardware and/or software, through custom hardware and/or software components, or through a combination thereof. Further, report generator 130 may reside as a standalone system within ACH 110 or may be a software component installed in a services server 120. Report generator 130 may be configured to process requests from customer computer 105 transaction histories among other things. Data extracted from database 125 may be formatted by report generator 130 and transmitted from a services server 120 to a customer computer 105. As illustrated and discussed herein, report generator 130 may process and format data relating to one or more customer 100 transactions in a manner to be received by a customer computer 105. However, practitioners will appreciate that report generator 130 may also produce any number of pre-configured and/or ad-hoc reports, which may be transmitted directly or indirectly to customer computer 105.

Middleware 135 may include any hardware and/or software suitably configured to facilitate communications and/or process transactions between disparate computing systems. Middleware components are commercially available and known in the art. Middleware 135 may be implemented through commercially available hardware and/or software, through custom hardware and/or software components, or through a combination thereof. Middleware 135 may reside in a variety of configurations and may exist as a standalone system or may be a software component residing within a services server 120. Middleware 135 may be configured to process transactions between services server 120 and other systems and components within ACH 110 and/or systems and components residing in backend systems 140.

Further, middleware 135 may contain logic for navigating, extracting data and entering data into various user interface screens and/or webpages. This type of logic most often uses patterns within a user interface and/or webpage to recognize and determine what command or action to execute next. A developer may create and define sequences of such patterns and create corresponding scripts providing instructions on what commands or actions to execute when each defined pattern is recognized. Practitioners will appreciate that there are a number of commercially available software tools, which facilitate this type of communication between disparate computing systems. Such tools are often referred to as pattern recognition systems or, screen-scrapers.

Figure 2:
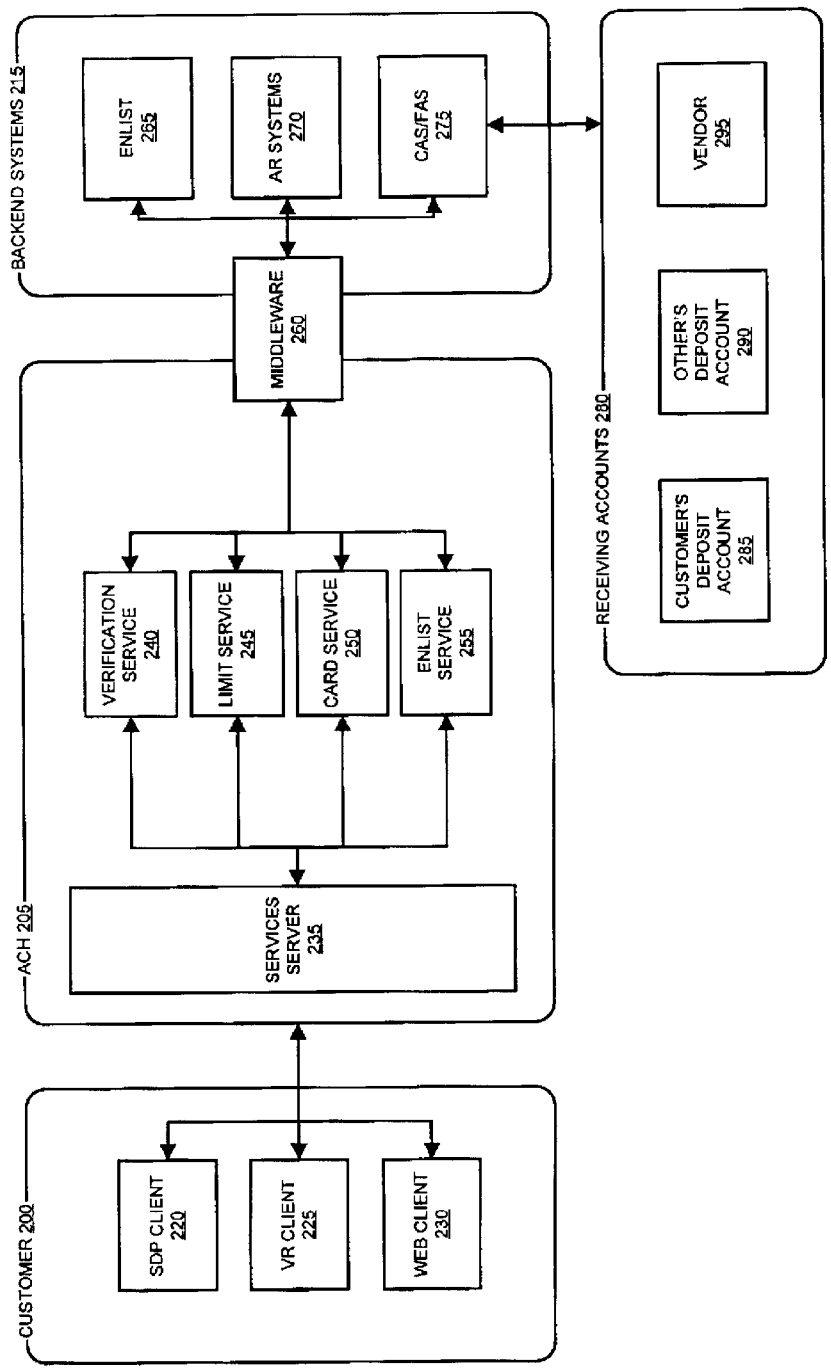
FIG. 2 is a block diagram illustrating a detailed view of exemplary major system components for an automated system for processing credit line transfer transactions.

FIG. 2 is a block diagram illustrating a detailed view of the major system components for an automated clearinghouse for processing credit line transfer transactions. The system components may best be described according to functional groups such as, customer 200, ACH 205, backend systems 215 and receiving systems 280. Practitioners will appreciate that for simplicity processes that may be performed by multiple components may be illustrated and discussed herein as single components. For example, AR systems 270 are presented as a single block component in FIG. 2, however AR systems 270 may comprise any number of computing platforms and systems. Further, the sequences for processing credit line transfer transactions may occur in sequenced order, simultaneously, or a combination thereof and therefore does not limit the scope of the invention.

Customer 200 may represent any number of individual client systems which connect to ACH 205 in order to facilitate management of credit line transfer services. As illustrated, a customer 200 may interact with ACH 205 through a service delivery platform client 220 (SDP) such as, for example, an ATM or kiosk. A customer 200 may also interact with a ACH 205 through a voice recognition client 225 employing telephony technology enabling a customer 100 to manage credit line transaction services through a telephone connection and issuance of touch-tone and/or voice commands. Further, client 200 may interact with ACH 205 via a web client 230 connections to ACH 205 over the Internet. These and other various technologies for interacting with a server are known in the art will not be discussed at length herein.

Referring to FIG. 1, transmissions of data between customer computer 105 and services server 120 may pass through a firewall 115 in order to ensure the security of ACH 110 components. Referring again to FIG. 2, services server 120 may initialize various services in response to transmissions of data between two or more components of the invention. Services, as used herein, may include any hardware and/or software suitably configured to process specific types of information. Services may apply computing logic in order to process information through various steps including, for example, compiling, sending, receiving, configuring and validating. Services may comprise program code stored within memory components of services server 235, or may reside in other computing components. Further, services may comprise Java servlets, JSPs, ASPs and/or any other server-side programming architecture.

Verification service 240 may receive and process information relating to authentication of customer identities and credit account credentials. Verification service may exchange and process data as provided by a customer 200 and interact through middleware 260 with a card authorization system/funds access system (CAS/FAS) 275.

Limit service 245 may receive and process information relating to credit line limits in order to grant or deny a transfer request. For example, if a customer 200 connects to ACH 205 and initiates a transfer of $2,000 from a business line of credit into a personal deposit account, limit service 245 may receive the request and interact with CAS/FAS 275 to ensure that the customer's available credit limit meets or exceeds $2,000. Limit service 245 may also restrict, change or deny requests that are, for example, above the credit limit. Limit service 245 may interact with various backend systems 215 through middleware 260.

Enlist service 255 may receive and process information relating to customer 200 enlistment for a new line of credit or other services offered by a credit provider. Enlist service 255 may interact with various backend systems 215 in order to determine a customer's 200 credit worthiness, payment histories, participation in other services, and the like. Enlist service 255 may interact through middleware 260 with any number of other backend systems which are known in the art for automated enrollment into a credit related program.

A credit line transfer request may include specifics concerning a receiving account 280 where transferred funds are to be deposited. Receiving account 280 may include a customer's deposit account 285, a jointly owned account, a deposit account not belonging to a customer 290, a vendor account 295 or payment systems and any number of other accounts capable of receiving electronic funds transfers. For example, a customer 200 who wishes to engage in a purchase for an item, wherein the seller is not a retailer and therefore cannot accept credit cards, may do so by connecting to ACH 205 and initiating a transfer of cash from her personal credit line to the seller's deposit account 290.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, provider data; financial institution data and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. User computer can be in a home or business environment with access to a network. In an exemplary embodiment, access is through a network or the Internet through a commercially available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, AppleTalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service, which receives a request from a web server, the request including a URL (http://yahoo.com/stockquotes/ge) and an IP address (123.56.789). The web server retrieves the appropriate web pages and sends the data or applications for the web pages to the IP address. Web services are applications, which are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

Each customer may be equipped with a computing device in order to interact with the system and facilitate online credit line transfer transactions. The customers each have a computing unit in the form of a personal computer, although other types of computing units may be used including laptops, notebooks, hand held computers, set-top boxes, cellular telephones, touch-tone telephones and the like. A system administrator may have a computing unit implemented in the form of a computer-server, although other implementations are contemplated by the invention. The account manager has a computing center shown as a server. However, account manager computing center may be implemented in other forms, such as a mini-computer, a PC server, a network of computers located in the same of different geographic locations, or the like. Moreover, the system contemplates the use, sale or distribution of any services or information over any network having similar functionality described herein These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Referring now to FIGS. 3-6, the process flows depicted are merely exemplary embodiments of the invention and are not intended to limit the scope of the invention as described herein. For example, the steps recited in any of the method or process descriptions may be executed in any order and are not limited to the order presented. It will be appreciated that the following descriptions make appropriate references not only to the steps depicted in FIGS. 3-6, but also to the various system components as described above with reference to FIGS. 1-2. Further, illustrations of the process flows and the descriptions thereof make reference to webpages, websites, web forms, prompts, etc. Practitioners will appreciate that the illustrated steps described below may exist in any number of configurations including the use of webpages, web forms, popup windows, prompts and the like. It should be further appreciated that the multiple steps as illustrated and described may be combined into single webpages but have been expanded for the sake of simplicity. In other cases, steps illustrated and described as single process steps may be broken down into multiple webpages but have been combined for simplicity.

Figure 3:
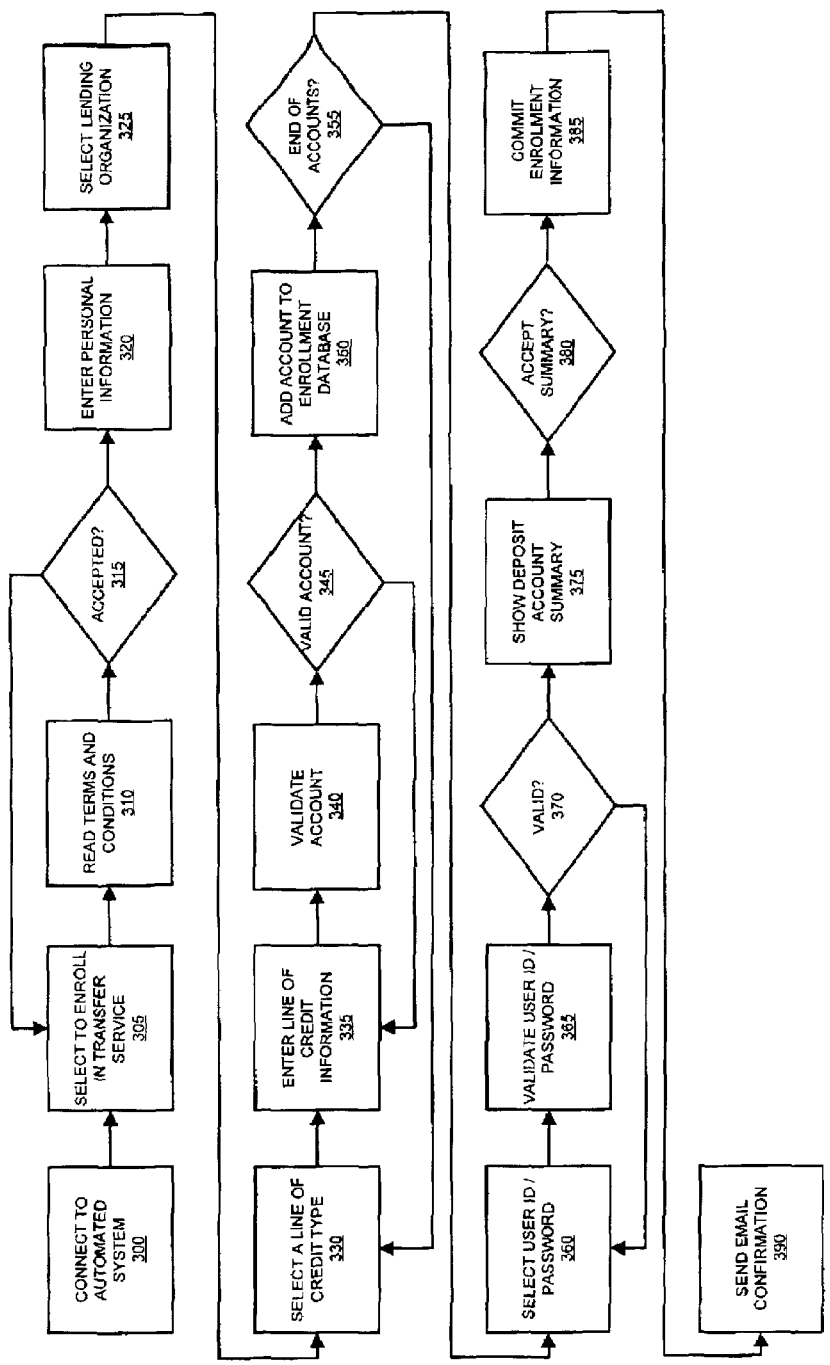
FIG. 3 is a flow chart illustrating an exemplary method for enrolling with a deposit account to conduct transfer transactions.

FIG. 3 is a flow chart illustrating an exemplary method for enrolling to use ACH 205 in order to conduct line of credit transfer transactions. ACH 205 may require enrollment in order to maintain account information, provide security and provide for an audit trail for customer 200 transfer transactions. A customer 200 may initiate the enrollment process through a suitable network connection with an automated system of the invention (step 300). In other embodiments, the invention may allow enrollment through any other component of the system. FIG. 3 illustrates an exemplary enrollment process as it may be conducted through an Internet web browser. Practitioners will appreciate that a similar process flow may also be applicable to any other device capable of interacting with ACH 205 such as, for example, a PDA, telephone, cell phone, kiosk, ATM, and the like.

On a website homepage for ACH 205, customer 200 may select to enroll in a transfer service (step 305). Methods for browser interactions through webpages are known in the art and may include graphical user interface (GUI) elements such as, for example, buttons, menus, drop-down lists, hyperlinks, and the like. Following a selection to enroll in a transfer service (step 305), a customer 200 may be presented terms and conditions (step 310) and prompted to select whether or not they agree to abide by the terms and conditions. Terms and conditions (step 310) may comprise disclosure of fees, proper use and conduct rules, and various legal disclaimers. If a customer 200 agrees to, and thereby accepts, the terms and conditions (step 315) then customer 200 may be returned to a webpage where they may again select to enroll in a transfer service (step 305) or exit from the website. If customer 200 accepts the terms and conditions (step 315), then customer 200 may be presented a web form and prompted to enter personal information (step 320). Personal information may include customer's 200 name, telephone number, email address, account information and the like.

In an exemplary embodiment, ACH 205 may be configured to allow customers 200 to manage various lines of credit accounts from various participating account managers. Under this scenario, for example, ACH 205 may serve as an independent third party to customers 200 of various account managers, such as American Express, Visa, MasterCard, Discover as well as any other lending organization offering personal or business lines of credit. In another embodiment, ACH 205 may be exclusively accessible by customers 200 of a single account manager. For example, American Express may own ACH 205 as a service to American Express business customers. In the case of the former, a customer 200 may be presented a list of participating lending organizations (step 325). A customer 200 may be prompted to select one or more lending organizations, of which the customer 200 subscribes.

Depending on the types of credit the selected lending organization(s) offer, a customer 200 may be prompted to select the line of credit type (step 330) which customer 200 would like to add to an ACH 205 account. For example, information required for validating and processing transactions based on an open line of credit may be different than transactions performed against a credit card line of credit.

Following the selection of the line of credit type (step 330), customer 200 may be presented a web form and prompted to enter account specific information relating to the line of credit (step 335). Line of credit information may include, for example, an account number, loan number, loan date, limit information, authorization credentials and the like. Personal information (step 320) and account information (step 335) may be transmitted to ACH 205 where the information may be parsed, formatted and transmitted to CAS/FAS 275 in order to validate the account (step 340). If an account is determined to not be valid (step 345), or if authentication credentials are not accurate, customer may again be presented with a web form and prompted to enter line of credit information (step 335). However, if the account is valid (step 345) then personal and account information may be transmitted to ACH 205 and stored in an enrollment database (step 350).

In addition to providing account specific data which may be required to identify the account, a customer 200 may be required to enter additional information in order prevent fraudulent use of the line of credit. Practitioners will appreciate that there are a number of methods known in the art for ensuring that the customer 200 is the true owner of the line of credit. For example, when setting up a line of credit, a customer 200 may be asked to provide their mother's maiden name, a pass code, a biometric or a question to which only the customer 200 would know the answer.

In an exemplary embodiment, a customer 200 may be allowed to add multiple credit lines to ACH 205 service. This may include multiple lines of credit provided by a single account manager and/or lines of credit provided by multiple account managers. If a customer has an additional line of credit from the same creditor to add to ACH service (step 355), then customer may again be presented with a web form and prompted to select a line of credit type (step 330) where information regarding the additional account may be collected, validated and stored. In another embodiment, a customer 200 may add lines of credit from various participating account managers. Under this scenario, the customer 200 may be presented with a web form and prompted to select a lending institution (step 325). The system may have routing and other information stored in association with the pre-established selections or it may request any additional information needed to interface with the line of credit.

If customer 200 has no more lines of credit to add to an ACH service (step 355), then customer 200 may be prompted to select and enter a user ID and/or password (step 360). A user ID and/or password selection may be unique to the customer 200 and restrict unauthorized access to ACH 205 service. A user ID and/or password selection may be transmitted to ACH 205 where it may be validated (step 365) for proper form and to insure that another customer 200 has not selected it previously. If the user ID and/or password selection in not valid (step 370), then customer 200 may again be prompted to select another user ID and/or password (step 360). If the user ID and/or password selection is valid (step 370) then customer 200 may be provided a webpage showing a summary of the new ACH service (step 375). A summary may include information regarding lines of credit added to an ACH 205 as well as limits or balances. Customer 200 may be prompted to indicate whether or not they agree with the information contained in the account summary. If customer 200 does not accept the summary (step 380), then any line of credit account information that has been stored in an enrollment database 125 may be removed and customer 200 may choose to re-enter the information, or exit from the ACH 205 website. If customer 200 accepts the information contained in the summary (step 380) then enrollment information may be transmitted to an ACH 205 to be stored with account information in enrollment database (step 385).

Following a successful enrollment, ACH 205 may activate a communications component (not shown) to generate and send an email message (or any other communication via any network or device discussed herein) to a new ACH customer (step 390). An email may contain summary information as well as information regarding how to use the ACH 205 website to initiate a transfer transaction. Practitioners will appreciate that an ACH 205 may initiate a postal mailing to a customer 200 containing like information in the form of a confirmation and/or membership package.

Figure 4:
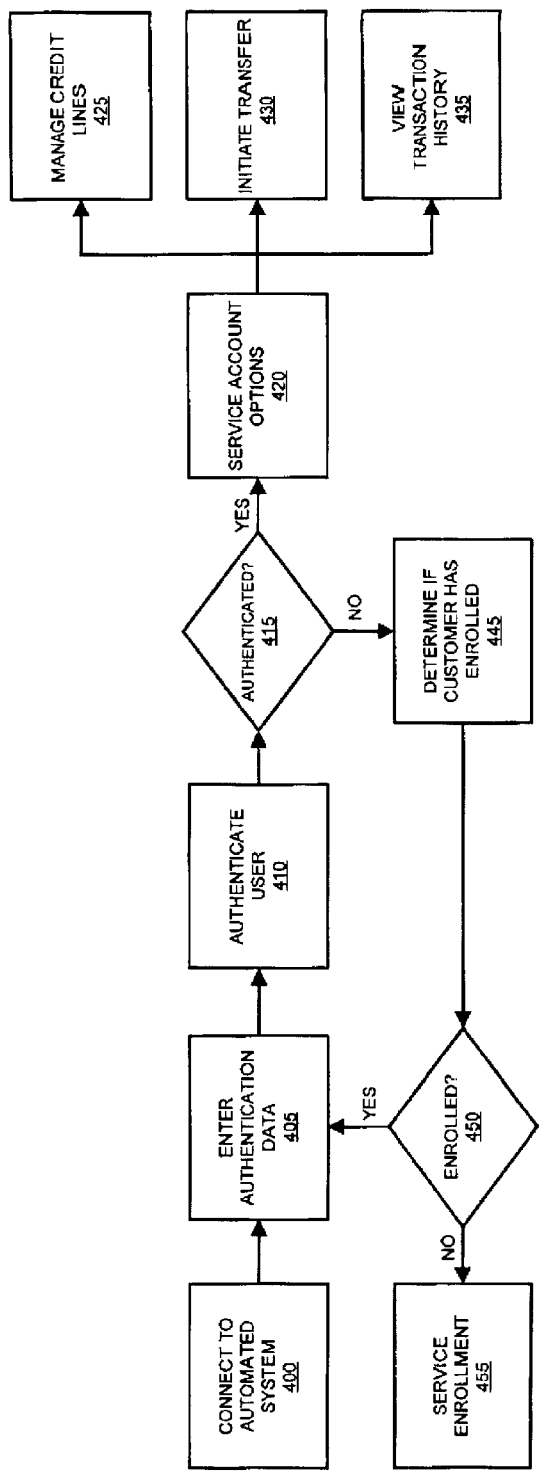
FIG. 4 is a flow chart illustrating an exemplary method for interacting with an automated system to manage accounts and initiate transfer transactions.

FIG. 4 is a flow chart illustrating an exemplary method for interacting with an ACH 205 in order to manage line of credit accounts and initiate transfer transactions. A customer 200 who has an established account with ACH 205, may connect to an automated system (step 400) through any means known in the art and as discussed above in reference to FIG. 2. Customer 200 may be prompted to enter authentication information (step 405) in order to authenticate the customer's 200 identity (step 410). Customer's 200 authentication information may be transmitted to ACH (step 445) to be verified against the information stored in enrolment database 125. Authentication information may include a user ID and/or password, which may be selected by a customer 200 or assigned by ACH 205 at the time of enrollment. Practitioners will appreciate that many additional security measures may be employed in accordance with the login and authentication processes described herein.

Customer 200, who is not properly authenticated (step 415), either through user error or because of unauthorized use, may not be permitted to further access ACH 205 account options (step 420). An unauthorized login attempt may initiate a prompt to determine if the customer 200 has previously enrolled (step 445). If customer has enrolled (step 450), then customer 200 may again be prompted to enter authentication information (step 405). If customer 200 indicates that they have not yet enrolled for transfer service (step 450) then customer may be directed to an enrollment webpage (step 455). If customer is appropriately authenticated (step 415) then customer 200 may be presented with service account management options (step 420). Service account options (step 420) may comprise as user interface elements such as, for example, buttons, menu items, lists, hyperlinks as well as any other means known in the art. Customer 200 may select to manage credit lines (step 425), initiate a line of credit transfer (step 430), and view transaction history (step 435). Each will be discussed in greater detail herein.

Figure 5:
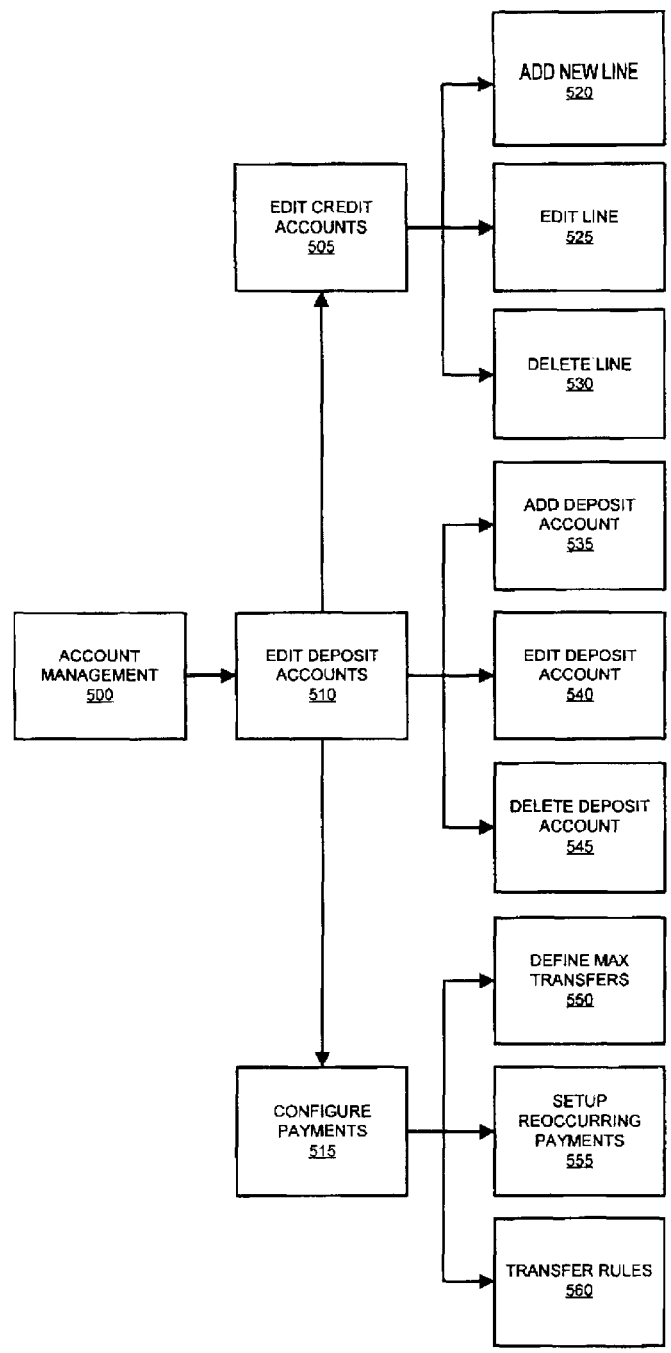
FIG. 5 is a flow chart illustrating a high level view of an exemplary method for managing an enrolled deposit account; and, FIG. 6 is a flow chart illustrating an exemplary method for facilitating a transfer of funds from a line of credit to a deposit account.

FIG. 5 is a flow chart illustrating a high level view of an exemplary method managing an transfer account. From an account management webpage (step 500) a customer 200 may select to edit lines of credit (step 505), edit deposit accounts (step 510) and configure payment (step 515).

Managing lines of credit (step 505) may enable customers 200 to manage lines of credit, which will be made available for ACH 205 transfer transactions. As discussed in reference to FIG. 3, a customer 200 may add one or more lines of credit to an ACH 205 account during the enrollment process. A customer 200 may later choose to add additional lines of credit (step 520) in order to facilitate transfer transactions through ACH 205. The steps which may be required to add one or more lines of credit to an ACH 205 account are illustrated and explained in detail in reference to FIG. 3.

Editing a line of credit (step 525) may enable a customer 200 to modify account details. Many payment systems use a line of credit's billing address as another layer of validation in order to prevent unauthorized or fraudulent use. While some information such as customer's 200 date of birth or social security number are more static and not subject to change, a need may exist for a customer 200 to edit the information if it was entered incorrectly during enrollment.

Deleting a line of credit (step 530) may be desirable when a line of credit is no longer available due to closure of the line of credit account. A customer 200 may also decide to delete a line of credit from an ACH 205 account because they no longer want to barrow against the line of credit or because the balance has become too high. Deleting a line of credit would have the likely affect of removing all information relating to the line of credit from enrollment database 125 including scheduled transfer transactions.

In addition to providing a customer 200 the ability to manage lines of credit (step 505), ACH 205 may enable customer's 200 to manage deposit accounts. A deposit account is any financial account, which accepts third-party deposits. These may include, for example, personal checking and savings accounts, business accounts, investment accounts, retirement accounts, loyalty accounts, merchant accounts, billing accounts (e.g., utility accounts), recurring billing accounts or any other accounts associated with an account number or a transaction device. A deposit account is the destination for cash deposits originating via ACH 205 line of credit transfer transaction.

ACH 205 may provide customers 200 with the ability to add deposit accounts at any time so that they may be available for fast and convenient transfer transactions. These accounts may comprise one or more deposit accounts that a customer 200 intends to transfer money into on a semi-regular to regular basis. For example, a customer 200 who is also a small business owner may have a payroll account with a bank. If the customer 200 regularly transfers money into the payroll account prior to payday, he may choose to add the deposit account to his ACH 205 account in order to streamline the transfer process.

Adding a new deposit account (step 535) may include providing a web form and prompting customer 200 to enter information regarding a deposit account. Such information which may be required by ACH 200 may include, name of the bank or credit union, account name, account number, routing number, and the like. This information may enable ACH 205 to successfully transfer cash electronically from a line of credit to a deposit account.

ACH 205 may also enable customers 200 to edit deposit account data (step 540). A stated above in reference to editing a line of credit (step 525), deposit account data may change over time due to a changes in the statement address, account name, telephone numbers, and the like. If deposit account information, which may be stored in an enrollment database 125 does not match the information stored within the banking system, a deposit may be rejected. Customers 200 may also choose to edit information, which may not be critical to funds transfer into a deposit account. Such information may be edited in the interest of the customer's 200 internal bookkeeping and audit procedures.

Deleting a deposit account (step 530) may be desirable when a deposit account has been closed or when there is no longer a need to initiate transfer transactions involving the deposit account. Further, when a deposit account is no longer needed, it may be desirable to eliminate it from an ACH 205 account to eliminate the possibility of inadvertent transfers into the account. Deleting a deposit account may have the likely affect of removing all information relating to the account from an enrolment database 125 including scheduled transfer transactions into the deposit account.

From an account management (step 500) webpage, a customer 200 may choose to configure payments (step 515). Configuring payments may define how and when transfers are made. Defining a maximum transfer amount (step 550) may be desirable to help eliminate fraudulent transfers from both authorized ACH 205 account users as well as individuals who may breach the security of the system. For example, a small business owner who frequently transfers small amounts of cash from a line of credit to a deposit account may choose to set a transfer limit at $300.00. Therefore, the ACH 205 would reject any request for a transfer in excess of that amount. In another embodiment, a small business owner may define a maximum transfer amount that may be overridden by only limited ACH account users as designated by the business owner. The system may also incorporate known software which automatically or semi-automatically monitors transfers and flags unusual or inconsistent transfers. The system may notify the consumer and/or request additional approval for certain types of transfers. A more detailed description of access rights and security will be discussed below in reference to transfer rules.

Configuring reoccurring payments (step 555) may allow customers 200 to define a transfer transaction and setup a reoccurrence schedule. Reoccurring transfer transactions may be useful for transferring funds on a regular basis where the transfer amount is static. For example, a customer 200 who chooses to utilize ACH 205 to pay a monthly lease for a work truck may do so by defining the deposit account details for the leasing company, selecting a line of credit from which to draw the payment amount, defining the monthly payment amount and defining the date for which the transfer is to occur for each month. ACH 205 may also allow a customer to define start and end dates for reoccurring transfers.

Defining transfer rules (step 560) may enable a customer 200 to more closely control ACH 205 transfer transactions. A customer 200 may define rules globally which may apply to all transfers, or local rules to apply individually to each line of credit and deposit account. One such rule may enable a customer 200 to configure ACH 205 in order that only pre-defined deposit accounts may be used in transfer transactions, thus reducing the possible occurrences of fraudulent transfers or transfers made to unauthorized deposit accounts due to data entry errors.

Rules may also be defined in order to control which lines of credit may be used for transfers into specific deposit accounts where multiple credit lines and deposit accounts have been defined. For example, a rule may be defined that stating that transfers into the deposit account of an office supply store may only be initiated with credit line X and transfers to a property manager for lease payments can only be made with credit line Y. Additionally, defining which credit lines are used for transfer transactions may be based on the amount of the transfer. Controlling which credit lines are used based on a deposit account or transaction amount may be useful in controlling credit line balances and maintaining the lowest interest rates possible.

In another embodiment, a customer 200 may define rules governing how transactions, which exceed a line of credit, are conducted. If more than one line of credit has been added via ACH 205, then a customer 200 may create a rule that states that if a transaction exceeds the credit limit of a first line of credit, then a second line of credit may be used to transfer the remaining transfer balance. Rules further governing transfers in excess of a credit limit may include, for example, a rule defining the order in which lines of credit are debited and a rule to reject transactions which exceed a credit limit of a primary credit line when the excess reaches a determined dollar amount.

Transfer rules may also be established defining who may execute transfer transactions. Varying security levels may be established granting varying access privileges to users of a single ACH 205 account. For example, a company CFO may administer an ACH 205 account for his company and add various members of his accounting staff as ACH 205 account users and assign them various roles. She may define rules allowing her lead accountant to initiate transfers of up to $10,000 while other staff members are limited to transfers of up to $2,000. She may also define who is allowed to access and/or modify the various ACH 205 account management components.

Referring back to FIG. 4, a customer 200 who is presented with service account options (step 420) may choose to view transaction history (step 435). While not illustrated herein, practitioners will appreciate that there are a number of means for compiling, formatting, displaying and printing transactional information. A report generator 130 may be employed to extract data from an enrollment database 125 and format the data in a manner to be displayed on a computer screen and/or printed. ACH 205 may enable customers 200 to define report parameters such as, for example, start and end date, transactions made to particular deposit accounts, transaction made against specific lines of credit, and the like. ACH 205 may also provide customers with standard pre-defined reports as well as configurable or ad-hoc reports. Practitioners will also appreciate that providing a view of transaction history (step 435) may be carried out through any number of commercially available report generators, through custom software and/or hardware components, or through a combination thereof. Still further, it should be appreciated that reports may be generated from any combination of data stored on any combination of databases, files, stored procedures and the like.

Figure 6:
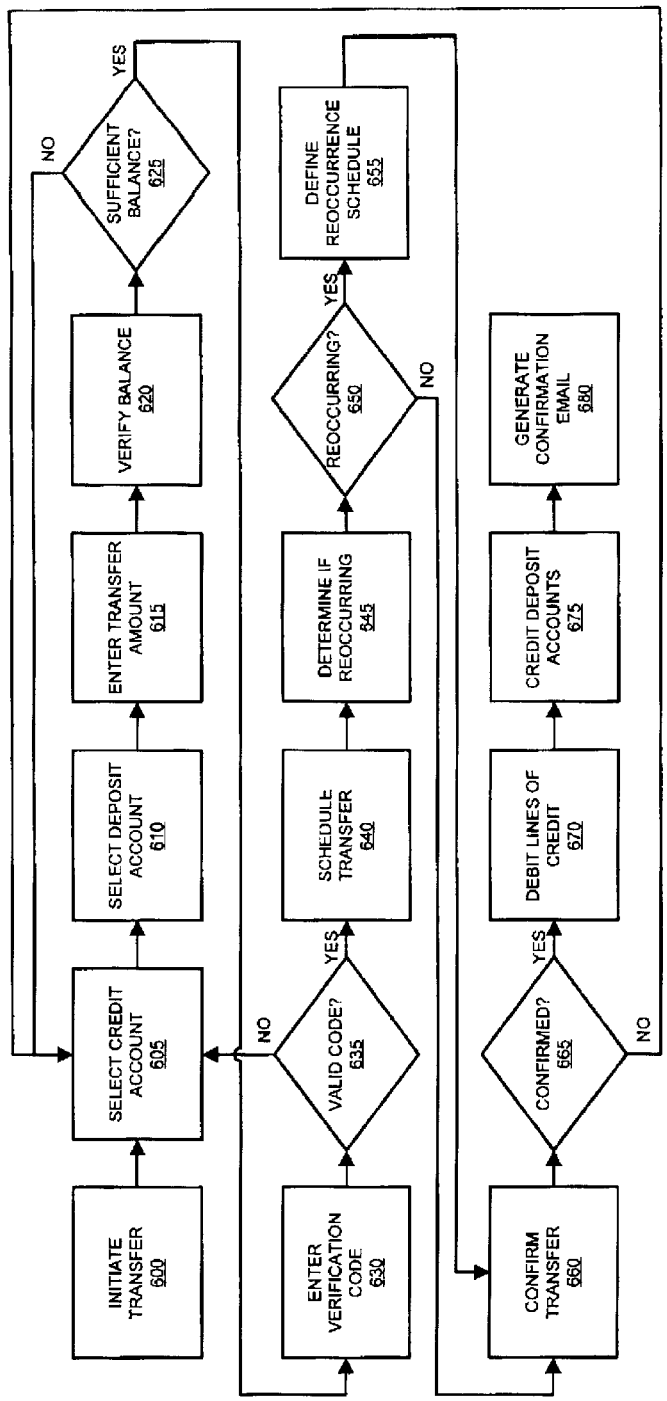

FIG. 6 is a flow chart illustrating an exemplary method for facilitating a transfer of funds from a line of credit to a deposit account. A customer 200 may initiate a transfer (step 600) by connecting to ACH 205 and entering authentication details as described previously. Customer 200 may be first prompted to select from a list containing one or more previously configured line of credit accounts (step 605). Customer's 200 selections of one or more line of credit accounts may represent the accounts that will be debited when a transfer transaction has been completed. ACH 205 may next prompt customer 200 to select one or more previously defined deposit accounts (step 610) which are to receive electronically transferred funds. Customer 200 may then be prompted to enter a currency value (step 615) to transfer from a selected line of credit into a selected deposit account. If customer 200 had previously selected more than one line of credit (step 605), customer 200 may be required to enter the currency value to be transferred from each line of credit individually. Likewise, if more than one deposit account was selected (step 610), then customer 200 may be required to enter the currency value to be deposited into each deposit account individually. The system may also include financial management programs and software which automatically suggest or enter amounts to transfer based upon various personal financial conditions such as, for example, U.S. Ser. No. 10/709,703 which was filed on May 24, 2004 and is entitled Pay Yourself First, which is hereby incorporated by reference.

In another embodiment, and as discussed previously, a customer 200 may have defined rules regarding how a transaction exceeding a line of credit limit for a primary line of credit should be executed. For example, if a customer 200 selects her American Express business line of credit for a transfer transaction and the transfer amount exceeds the available line of credit, then a rule may state that her American Express personal line of credit should be used as a secondary line of credit to cover the deficiency.

ACH 205 may then transmit the transaction details to the backend systems of the account manager(s) of the selected line(s) of credit. A limit service 245 may query CAS/FAS 275 in order to verify that the transfer amount requested does not exceed the available line of credit (step 620). If it is determined that one or more selected lines of credit are not sufficient for the transfer amount requested (step 625) then customer 200 may be informed of the deficiency and prompted to either select a new line of credit (step 605), add one or more additional lines of credit, or change the transfer amount. However, if a rule exists defining a sequence of two or more lines of credit to be used if a deficiency occurs, and if the combined lines of credit meet or exceed the requested transfer amount, then the transfer would be allowed.

If limit service 245 determines that there is sufficient credit available for the requested transfer amount (step 625), then customer 200 may be prompted to enter a verification code or password (step 630) unique to the one or more lines of credit. A verification code or password in addition to the ACH 205 login process may provide an additional layer of security. For example, during cardless transactions, such as a payment over the telephone using a Visa credit card, cardmembers are often asked to provide a three digit security code which is located on the back of a card. A verification code or password in addition to the customer's 200 credentials and account information which may be stored in an ACH database 125 may be transmitted to ACH 205 which may initialize a verification service 240 in order to query the appropriate backend systems in order to validate the customer 200 and line of credit. If verification service 240 determines that the verification code is not valid (step 635) then customer 200 may be prompted to select a credit account (step 605) where they may select a different line of credit for the transaction.

If customer 200 entered a valid verification code or password (step 635) then customer 200 may be prompted to schedule a date and time for the transfer to be executed (step 640). This may be useful for customer's 200 who want to ensure that a deposit account is credited by a certain date, however do not want to execute a transfer transaction too early thereby reducing interest payments. Further, a customer 200 may schedule multiple transfer transactions at a single time, rather that accessing ACH 205 to execute each transfer transaction individually. However, customer 200 may select an option to indicate that the transfer is to be executed immediately, therefore would not need to enter scheduling information.

ACH 205 may enable customers 200 to schedule reoccurring transfers (step 645). If customer 200 indicates that the current transfer should be scheduled on a reoccurring basis (step 650) then customer 200 may be prompted to enter the frequency of the transfer, define dates for transfers to occur, and define a date for the first transfer and a date for the final transfer.

Prior to executing the transfer transaction, a confirmation webpage (step 660) may be presented to customer 200 and include a description of the one or more line of credit accounts, description of the one or more deposit accounts, amount of the transfer, current balance information for the one or more line of credit accounts, projected balance for the one or more line of credit accounts, fee disclosures and the like. If a customer 200 reviews the confirmation and identifies an error or does not agree to the terms, the customer may choose to not confirm the transfer transaction (step 665) and customer may again be prompted to select a line of credit account (step 605) in order to correct errors or may exit from the ACH 205. If the customer 200 confirms the transfer transaction (step 665), then ACH 205 may initiate card service 250 in order to transact with the account manager's backend systems in order to execute the transfer transaction, debiting the customer's 200 one or more lines of credit (step 670) and crediting the specified one or more deposit accounts (step 675).

On successful completion of the transaction, customer's 200 line of credit may be debited by sending a transaction to a Financial Capture System and then passing the transaction to AR systems 270. A transaction, formatted according to NACHA standards, may be transmitted to an Originating Depository Financial Institution (ODFI) for clearing at the customer's 200 financial institution. The funds may then be deposited in the customer's 200 account during the next processing cycle.

Following a successful transfer transaction, ACH 205 may generate and send a confirmation email notice to the customer's email account (step 680). Confirmation email may contain details of the transaction as well as provide a confirmation number that customer may print and file. If for any reason the transaction is not successful, ACH 205 may generate and send a transaction failure email notice to the customer's 200 email account alerting customer 200 that the transfer transaction was not successfully executed and may include a description of the problem and contact information if technical support or account support is required. If a transfer transaction is executed immediately following the steps recited in FIG. 6, then a customer 200 may be provided immediate status of the transfer transaction through a webpage.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method of facilitating a transfer of a predetermined amount of funds from line of credit transaction accounts to a deposit account via an automated clearing house comprising:
    receiving, by a computer based system for transferring funds, a request for a transfer of said predetermined amount of funds;
    identifying, by said computer based system, a first line of credit transaction account associated with a first institution;
    determining, by said computer based system, that said predetermined amount of funds exceeds a first line of credit limit of said first line of credit transaction account;
    identifying, by said computer based system, a second line of credit transaction account associated with a second institution, wherein said first institution and the second institution are different institutions;
    sending a first transaction request to an automated clearing house financial capture system configured to capture and process transaction details for a first portion of the predetermined amount of funds;
    sending a second transaction request to said automated clearing house financial capture system configured to capture and process transaction details for a second portion of said predetermined amount of funds, wherein the second portion corresponds to an amount of the predetermined amount which exceeds the first line of credit limit for the first line of credit transaction account;
    wherein the computer based system stores pre-selected stored rules that include a rule to allow the request for the transfer of the predetermined amount of funds in response to the second portion being within a predetermined threshold;
    determining, by the computer based system that the second portion is within the predetermined threshold, wherein the request for the transfer of the predetermined amount of funds is allowed in accordance with the rule;
    generating, by said computer based system, a transaction based upon said first transaction request and said second transaction request;
    transmitting, by said computer based system, said transaction to an originating depository financial institution for clearing;
    identifying, by said computer based system, said deposit account;
    debiting, by the computer based system, the first line of credit transaction account the first portion of the predetermined amount of funds;
    debiting, by the computer based system, the second line of credit transaction account the second portion of said predetermined amount of funds; and
    crediting, by said computer based system, said deposit account said predetermined amount of funds.

2. The method of claim 1, wherein said debiting said first line of credit transaction account includes debiting said first line of credit transaction account of at least one of currency, loyalty points, coupons, credits, securities, negotiable instruments, gift cards, digital funds, and foreign currency.

3. The method of claim 1, wherein said predetermined amount of funds include a first currency, and wherein said method further includes converting said predetermined amount of funds to a second currency.

4. The method of claim 1, wherein said predetermined amount of funds include a first type of funds, and wherein said method further includes converting said predetermined amount funds to a second type of funds, wherein said second type of funds includes at least one of currency, loyalty points, coupons, credits, securities, negotiable instruments, gift cards, digital funds, and foreign currency.

5. The method of claim 1, wherein said first line of credit transaction account and said second line of credit transaction account transfer funds to a deposit account, wherein the deposit account includes at least one of: a personal checking account, a savings account, a business account, an investment account, a retirement account, a trust account, a loyalty account, a merchant account, a billing account, and a recurring billing account.

6. The method of claim 1, wherein said step of identifying said deposit account includes identifying said deposit account which includes at least one of: a personal checking account, a savings account, a business account, an investment account, a retirement account, a trust account, a loyalty account, a merchant account, a billing account, and a recurring billing account.

7. The method of claim 1, wherein the step of identifying said deposit account includes identifying said deposit account which includes a payment system.

8. The method of claim 1, further including maintaining by the computer based system said first line of credit by at least one of: applying rules, notifying a consumer, obtaining approvals, and applying limits.

9. The method of claim 1, further includes at least one of a step of: applying rules, a step of notifying a consumer, a step of obtaining approvals, and a step of applying limits to at least one of said debiting and crediting steps.

10. The method of claim 1, further includes a step of viewing transaction history associated with at least one of said debiting and crediting steps.

11. A non-transitory computer readable storage medium having stored thereon a plurality of instructions, said plurality of instructions if executed by a processor for executing transfers from line of credit transaction accounts to a deposit account via an automated clearing house, cause said processor to perform operations comprising:
    receiving, by said processor, a request for a transfer of a predetermined amount of funds;
    identifying, by said processor, a first line of credit transaction account associated with a first institution;
    determining, by said processor, that said predetermined amount of funds exceeds a first line of credit limit of said first line of credit transaction account;

identifying, by said processor, a second line of credit transaction account associated with a second institution, wherein said first institution and said second institution are different institutions;

sending a first transaction request to an automated clearing house financial capture system configured to capture and process transaction details for a first portion of the predetermined amount of funds;

sending a second transaction request to said automated clearing house financial capture system configured to capture and process transaction details for a second portion of said predetermined amount of funds, wherein the second portion corresponds to an amount of the predetermined amount which exceeds the first line of credit limit for the first line of credit transaction account;

wherein the processor stores pre-selected stored rules that include a rule to allow the request for the transfer of the predetermined amount of funds in response to the second portion being within a predetermined threshold;

determining, by the computer based system that the second portion is within the predetermined threshold, wherein the request for the transfer of the predetermined amount of funds is allowed in accordance with the rule;

generating, by said processor a transaction based upon said first transaction request and said second transaction request;

transmitting, by said processor, said transaction to an originating depository financial institution for clearing;

identifying, by said processor, a deposit account;

debiting, by the processor, the first line of credit transaction account the first portion of the predetermined amount of funds;

debiting, by the processor, the second line of credit transaction account the second portion of said predetermined amount of funds; and crediting, by said processor, said deposit account said predetermined amount of funds.

12. The method according claim 1, wherein the transaction requests are formatted in a National Automated Clearing House Association (NACHA) format.

13. The computer readable storage medium according to claim 11, wherein the transaction requests are formatted in a National Automated Clearing House Association (NACHA) format.

14. The method according claim 1, wherein the step of debiting said second line of credit account includes debiting said second line of credit account of at least one of: currency, loyalty points, coupons, credits, securities, negotiable instruments, gift cards, digital funds, and foreign currency.

15. The method according claim 1, further comprising verifying that the second portion of the predetermined funds do not exceed a second line of credit limit of the second line of credit account.

16. The computer readable storage medium according to claim 11, wherein the step of debiting said second line of credit account includes debiting said second line of credit account of at least one of: currency, loyalty points, coupons, credits, securities, negotiable instruments, gift cards, digital funds, and foreign currency.

17. The computer readable storage medium according to claim 11, wherein said plurality of instructions cause the processor to perform a step of verifying that said second portion of said predetermined amount of funds do not exceed a second line of credit transaction account.

18. An automated clearing house system comprising:
a processor configured to execute a computer program for executing transfers from line of credit transaction accounts to a deposit account via an automated clearing house;
a memory; and
said computer program configured to:
  receive, by said processor, a request for a transfer of said predetermined amount of funds;
  identify, by said processor, a first line of credit transaction account associated with a first institution;
  determine, by said processor, that said predetermined amount of funds exceeds a first line of credit limit of said first line of credit transaction account;
  identify, by said processor, a second line of credit transaction account associated with a second institution, wherein said first institution and said second institution are different institutions;
  send a first transaction request to an automated clearing house financial capture system configured to capture and process transaction details for a first portion of the predetermined amount of funds;
  send a second transaction request to the automated clearing house financial capture system configured to capture and process transaction details for a second portion of said predetermined amount of funds, wherein the second portion corresponds to an amount of the predetermined amount which exceeds the first line of credit limit for the first line of credit transaction account;
  wherein the processor stores pre-selected stored rules that include a rule to allow the request for the transfer of the predetermined amount of funds in response to the second portion being within a predetermined threshold;
  determine, by the processor that the second portion is within the predetermined threshold, wherein the request for the transfer of the predetermined amount of funds is allowed in accordance with the rule;
  generate, by said processor, a transaction based upon said first transaction request and said second transaction request;
  transmit, by said processor, said transaction to an originating depository financial institution for clearing;
  identify, by said processor, a deposit account;
  debit, by said processor, the first line of credit transaction account the first portion of the predetermined amount of funds;
  debit, by said processor, the second line of credit transaction account the second portion of said predetermined amount of funds; and
  credit, by said processor, said deposit account said predetermined amount of funds.

* * * * *